No. 649,410. Patented May 8, 1900.
I. H. JEWELL.
SYSTEM FOR CONTROLLING OPERATION OF FILTERS.
(Application filed Mar. 3, 1900.)
(No Model.) 3 Sheets—Sheet 1.
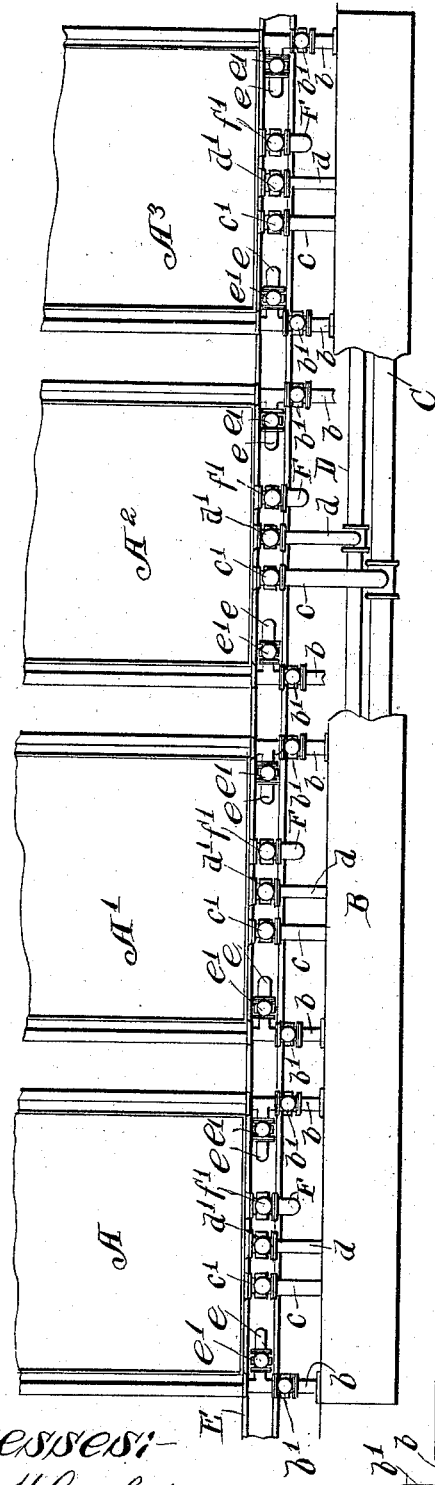
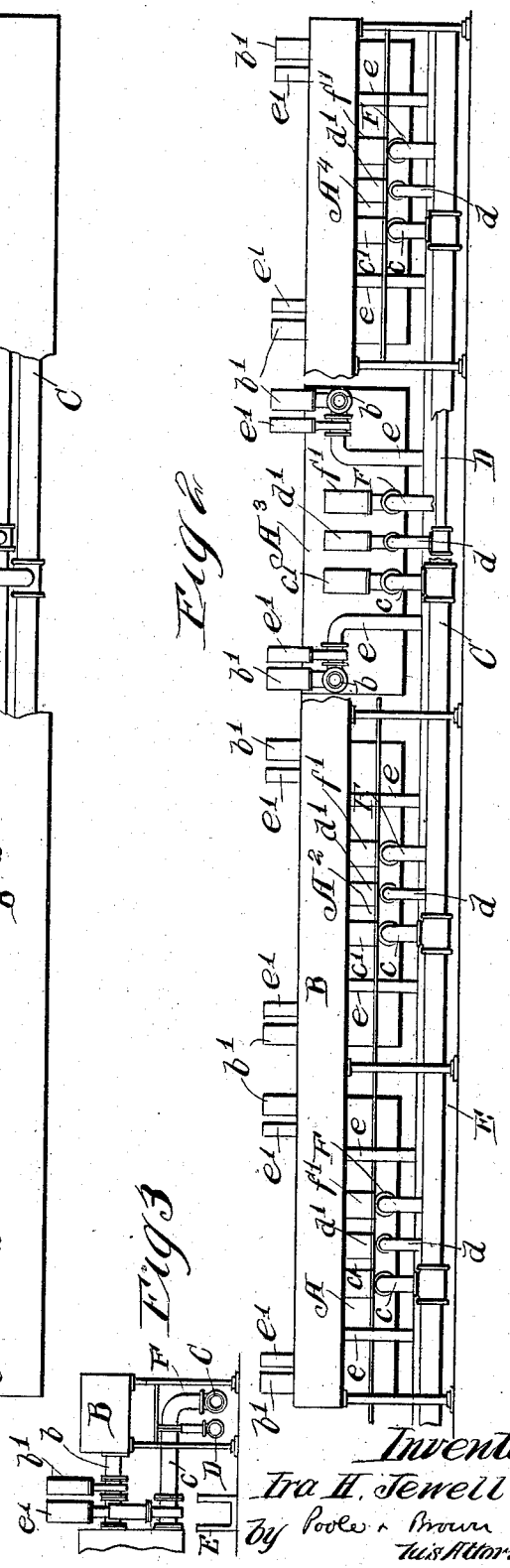
Witnesses:
Carl H. Crawford
C. W. Hills
Inventor:
Ira H. Jewell
by Poole & Brown
his Attorneys

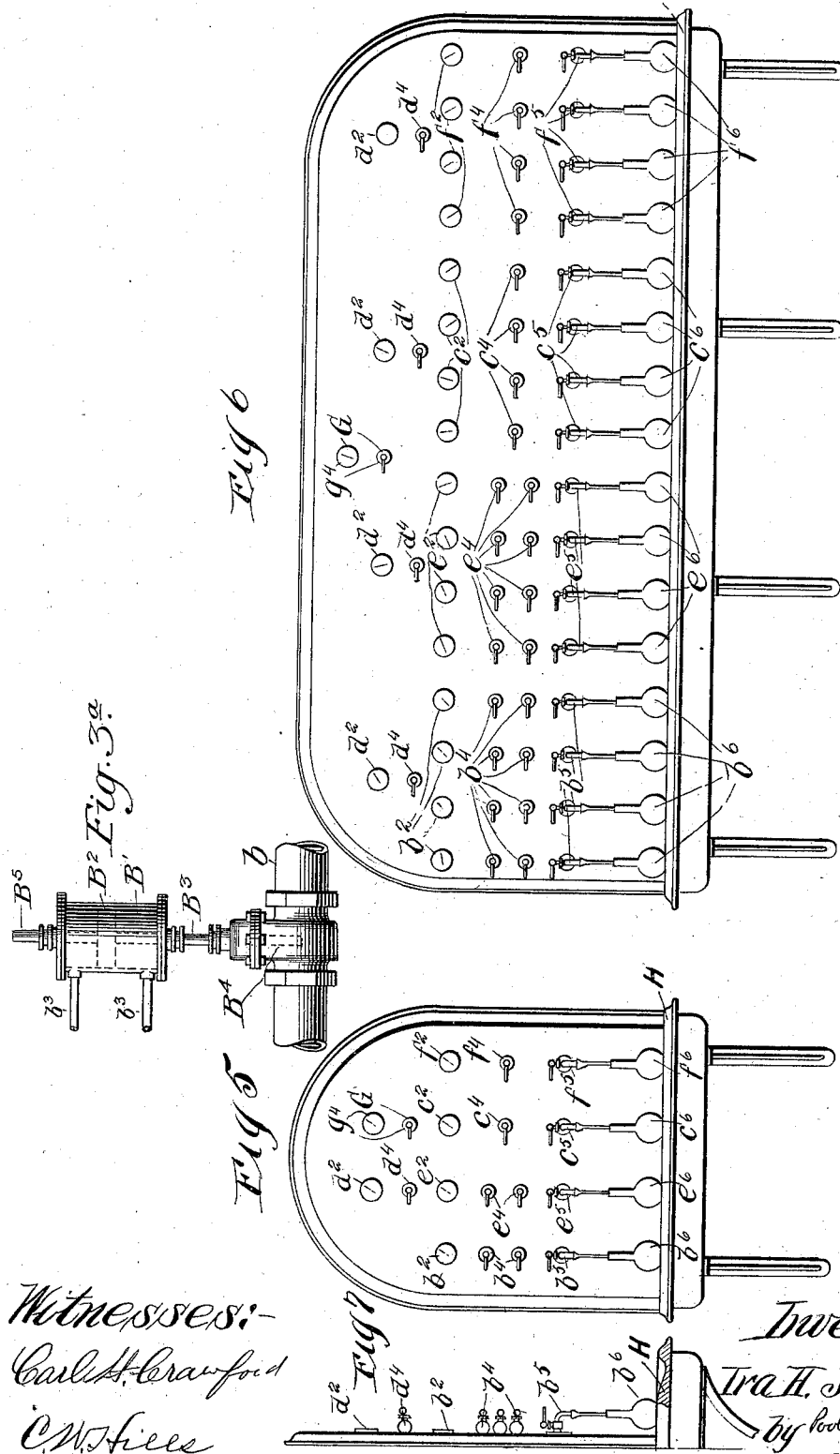

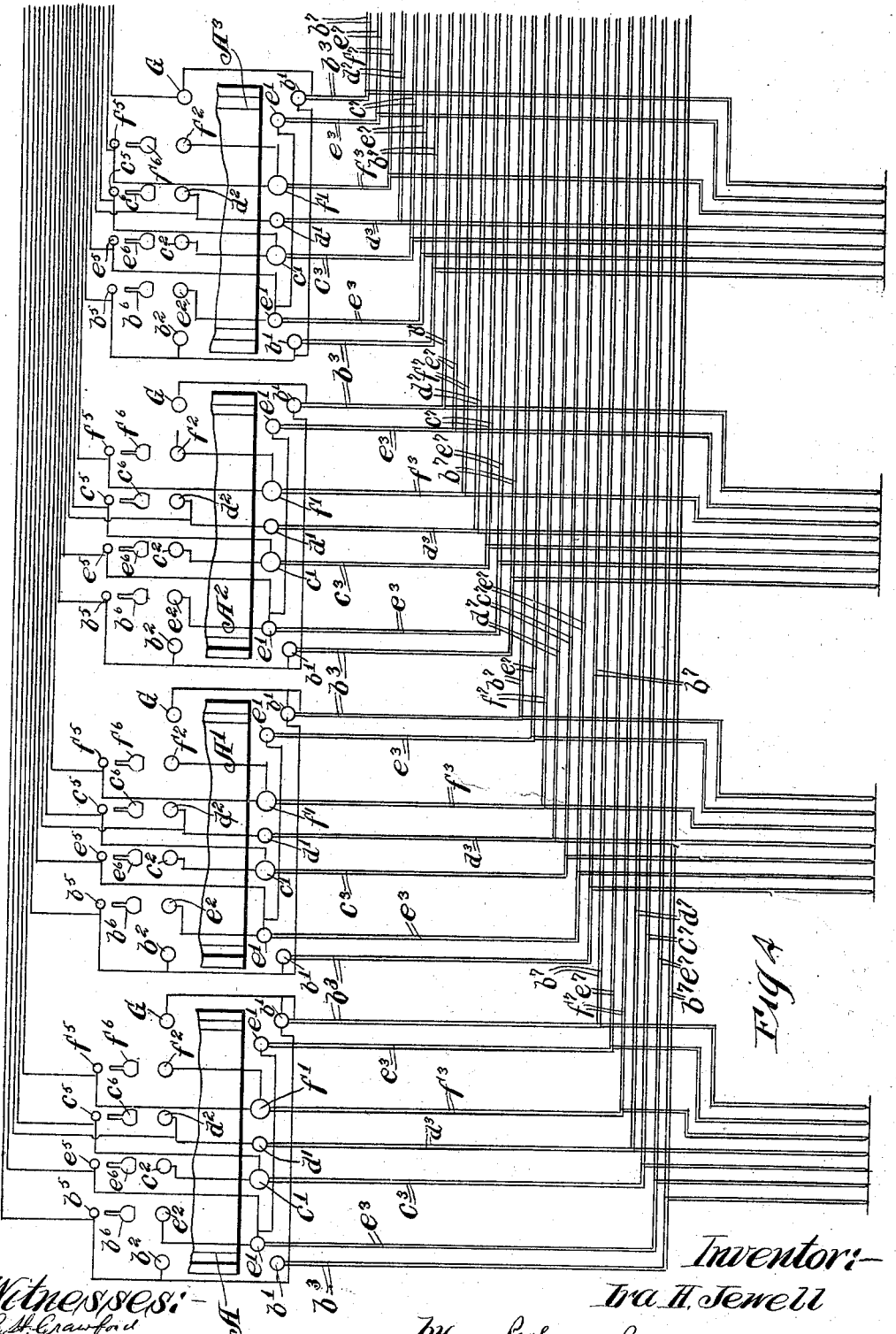

UNITED STATES PATENT OFFICE.

IRA H. JEWELL, OF CHICAGO, ILLINOIS.

SYSTEM FOR CONTROLLING OPERATION OF FILTERS.

SPECIFICATION forming part of Letters Patent No. 649,410, dated May 8, 1900.

Application filed March 3, 1900. Serial No. 7,175. (No model.)

*To all whom it may concern:*

Be it known that I, IRA H. JEWELL, of Chicago, in the county of Cook and State of Illinois, have invented certain new and useful Improvements in Systems for Controlling the Operation of Filters; and I do hereby declare that the following is a full, clear, and exact description thereof, reference being had to the accompanying drawings, and to the letters of reference marked thereon, which form a part of this specification.

This invention relates to improvements in systems for controlling and inspecting filtering plants of large capacity involving a plurality of filtering-tanks. In such plants it is necessary to cleanse the filtering material frequently, sometimes, depending on the condition of the supply-water, as often as three or more times a day. One of the most efficient methods of cleaning is by reverse washing or flushing either with or without the admission of air under pressure through the filtering material. This, as such plants have been heretofore conducted, necessitates the employment of a large force of men to operate the valves. Furthermore, it is important to know at all times the conditions under which the plant is operated and the efficiency of its operation. This heretofore has been determined by inspection at the individual tanks at a considerable expenditure of time and under conditions which usually preclude a comparative examination of the operation and conditions of all the filter units at one time.

My invention contemplates improvements for controlling and inspecting the operation of the filtration at each tank and also a system for control and inspection from a distant point, as a central station, whereby one operator can control the entire plant.

The invention consists in the matters hereinafter described, and more fully pointed out and defined in the appended claims.

In the drawings, Figure 1 is a top plan view of a battery of four tanks connected in a system. Fig. 2 is a front elevation of the same. Fig. 3 is an end elevation of the same. Fig. 3ª is a detail view of one of the hydraulic valves. Fig. 4 is a diagrammatic view illustrating arrangement of pipes forming a hydraulic system for operating valves and also showing each tank provided with independent operating and testing devices. Fig. 5 is a view of one of the individual gage-boards. Fig. 6 is a view of the central gage-board. Fig. 7 is a transverse vertical section of one of said gage-boards.

In said drawings a battery of four filter units or tanks is shown, said filter units or tanks being designated by A, A', A², and A³, respectively. The said units may be of any desired form or construction; but as herein shown the same are sand-bed filters fed by a flume or water-supply pipe (indicated by B) extending transversely of said filter-tanks and connected with each of the same by two inlet-pipes $b\ b$, entering at opposite sides of the tank and controlled by hydraulic valves $b'$ of any desired construction.

C indicates a pipe adapted to contain the wash-water under pressure and which communicates with the bottom of each tank beneath the sand-bed by means of a delivery-pipe $c$. Said pipe $c$ is closed by a hydraulic valve $c'$.

D indicates an air pipe or main. $d\ d$ indicate pipes connecting the same with each of said tanks beneath the sand-bed thereof and provided with a hydraulic valve, (indicated by $d'$.)

E indicates a trough adapted to receive the overflow waste or wash water and leading to the sewer. $e$ indicates an overflow or waste pipe leading from the said tank and delivering the said overflow or waste water to the sewer. Said overflow or waste pipes $e\ e$ are closed by hydraulic valves $e'\ e'$, similar to the hydraulic valves heretofore mentioned or of any preferred construction.

F indicates the pipe adapted to receive pure water from the filters and convey the same to the water mains or reservoir for delivery and consumption. $f'$ indicates a hydraulic valve adapted to close said pipe F.

A convenient form of hydraulic valve is shown in Fig. 3ª and illustrated in connection with one of the inlet-pipes $b$, leading from the flume B to the filter. Said device consists of a casing B', provided with a piston B², as shown in dotted lines, the casing being closed at its upper and lower ends by end walls. Said piston has a stem B³ at its lower part attached to the valve B⁴ of the pipe $b$, and said piston is also provided with a guide-stem $B^5$, projecting upwardly therefrom and having engagement with a guide-opening in the upper wall of the casing. Said casing is provided in its side wall above and below the piston with orifices, through which the pipes $b^3$ have communication with the interior of the casing on both sides of the piston. The form of valve may, however, be varied as desired.

A system such as described or composed of filter units of any desired kind is provided conveniently near each tank with hydraulic operating-valves and gages, indicating the pressure on each of the before-mentioned pipes, as clearly indicated in Fig. 4, and conveniently arranged on a single gage-board, as illustrated in Fig. 5, to facilitate inspection and operation. The said gages are of familiar construction, and, as shown, one of the same $b^2$ is connected by means of a small pipe or tube with each of the water-inlet pipes $b$, so that the pressure, if any, on the said main or water-inlet pipe will be clearly indicated on said gage. In a similar manner the gage $e^2$ is connected with each of the waste-water pipes $e$ $e$. Inasmuch, however, as there is but one wash-water-inlet pipe $c$, the gage $c^2$ has connection with but a single pipe. Also there being but one pipe $d$ for the air-inlet, the gage $d^2$ is connected with the same to indicate the air-pressure at all times in said air-inlet pipe. The pure-water pipe F is also provided with a gage $f^2$, which indicates clearly the pressure at all times within the main. The said hydraulic valves and tanks are connected with hydraulic operating-valves by means of water-pipes, as clearly indicated in said Fig. 4. The said water-pipes, connecting said valves, are indicated respectively by the letters $b^3$ of which there are two, $e^3$ of which there are also two, and pipes $d^3$, $c^3$, and $f^3$. The said hydraulic operating-valves, as shown in Figs. 5 and 6, indicating the gage-boards are provided with actuating-levers and are designated as $b^4$ $b^4$, $e^4$ $e^4$, $c^4$, $d^4$, and $f^4$. The gage-board is also provided with a regulating-valve and a gage G, connected with the said connecting water-pipes and designed to show at all times the pressure therein.

As a further improvement and for the purpose of more effectively inspecting the operation of the filters said gage-board is provided with a plurality of test or exhibition flasks adapted to exhibit at all times samples of the water contained in the different mains. Said exhibit or test flasks may be conveniently supported on a horizontal shelf or ledge H, secured to said gage-board, and are each shown located beneath the gage connected with the pipe containing the water to be exhibited in said flasks, and pipes or tubes lead downwardly from the supply-pipes for the gages $b^2$ $e^2$ $c^2$ $f^2$ to points above said flasks or receptacles and are provided at the lower end thereof with faucets $b^5$ $c^5$ $e^5$ $f^5$, respectively. By turning on said faucets said samples of the water to be filtered or raw water, the wash-water waste, and also the water used in washing before the same is forced into the filter, and the pure or filtered water may be obtained.

Obviously from the construction described an operator standing before the gage-board of one of the said units or tanks can instantly tell from the examination of the gages and the samples of water shown the condition of the filter and if the same is doing satisfactory work or not. Said gages show readily the pressure in each of the water inlet and outlet pipes, also the pressure in the air-main. By operating said valves from the said gage-boards he may with facility thoroughly cleanse the filter unit or tank and at all times insure the effective operation of that particular unit in the filter system. One of the great difficulties, however, that has stood in the way of the successful operation of a large filter system in the larger cities has been the difficulty in providing for thorough inspection and control of the system as a whole by the responsible head of the department or of the chief engineer having charge of the system. For the purpose of obviating this difficulty I have devised means for providing a central station either near said battery of units or tanks or remote therefrom, said central station, as shown, being provided with duplicates of each of the gages shown on the individual gage-board at the tank and also with duplicates of the operating-valves and testing devices heretofore described.

Referring first to the method of connecting the hydraulic operating-valve at the central station with the hydraulic valve of each tank, I have provided connecting water-pipes $b^7$, $e^7$, $c^7$, $d^7$, and $f^7$, which communicate, respectively, with the connecting water-pipes $b^3$, $e^3$, $c^3$, $d^3$, and $f^3$ and which lead to said central station. Connected in said pipes are duplicates of the hydraulic operating-valves shown at the individual tanks, as clearly indicated in Fig. 6. Said valves, as shown, are indicated, respectively, by letters $b^4$, $e^4$, $c^4$, $d^4$, $f^4$, and $g^4$. In a similar manner duplicate gages are provided, said gages being connected by tubes with the tubes communicating with the gage on the individual board and indicated, respectively, by the letters $b^2$, $e^2$, $c^2$, $d^2$, $f^2$, and G. Obviously any desired arrangement of the said gages and valves upon the gage-board may be made. However, as shown, there being but four tanks in the system indicated in the drawings, the said gages and valves are arranged in order horizontally. In other words, all the gages are indicated over the corresponding operating-valves. Display vessels containing samples of the water are also provided at the said central station and are conveniently supplied with water from a pipe or tube leading downwardly from the pipe or tube connected with the corresponding gage at said central station in a manner similar to that heretofore described for the display vessels at the individual station. Obviously the number of vessels of each kind will correspond with the number of tanks. As herein shown there are four such display vessels to indicate the raw water or unfiltered water, the same being indicated by the letters $b^6$. In like manner each of the vessels $e^6$ $c^6$ $f^6$ of the individual stations will be represented by four of such vessels bearing the same letter at the central station, as indicated in Fig. 6. Any convenient device for holding said display vessels may be provided at said central station; but, as shown, said gage-board is provided with a horizontal shelf or support similar to that indicated in Fig. 5, (indicated by H',) and the said vessels are arranged thereon beneath appropriate faucets connecting with the pipes leading to the appropriate gage and indicated, respectively, by letters $b^5$, $e^5$, $c^5$, and $f^5$.

The operation of my device is as follows: The filter system being in operation, an engineer or superintendent at said station can readily by inspection see the condition of any individual filter in the entire system. He may also observe the pressure in any of the mains connected therewith. This is a matter of great importance, inasmuch as the pressure if too great in certain of the mains—as, for instance, the air-main—will disturb the sand of the filter-beds too much and seriously interfere with the operation of the filter. Having the means of observing the pressure in the various mains, the operator may regulate the same by means of said valves. Being located at the central station and presumably having convenient access to the pumping-machines and other devices for regulating said pressure, the entire system is at all times thoroughly within his control, enabling prompt and efficient action to be taken in case of emergency. The same is obviously not true to the same extent of an operator at the tank. Having samples of the water at all times under inspection, and thus having visible evidence of the condition of each filter, the operator at said central station may apply the needed remedy to any defective condition by operation of the appropriate valves at the gage-boards, thereby dispensing with operators at the tanks. If such assistants are employed, he is enabled to guard against their negligence—as, for example, his own gage-board will show every change made at the unit by said assistants. Should he observe that an operator at the individual tank is washing his filter too much to the injury of the efficiency of the same, he can readily discontinue the operation, and thereby give notice to the negligent operator of his careless oversight. In the same manner if it be found that the tank is not operating successfully he may apply the washing or flushing process from said central station independent of any operator at the tank. Obviously from the construction described said engineer at the central station is able to know at any moment which tanks are in operation and which are not, and which are operating successfully and which are not. If assistant operators are employed at the tanks, he is able to know from day to day the efficiency with which they each do their work and at all times may maintain such oversight as will insure the highest efficiency in the operation of the system and at a very greatly reduced expense for operation. Obviously the arrangement of various gage-boards will depend upon the conditions existing in the various plants. I have herein shown but one of many convenient methods of arrangement.

While I have herein shown hydraulic connections between the several valves and the actuating devices therefor located both at the several units and at the central station, it is obvious that other means may be employed for this purpose.

I claim as my invention—

1. A filter provided with a system of controlling-valves which are provided with actuating devices located so as to be accessible for control from a single position of an operator.

2. A filter system provided with a plurality of controlling-valves, the valves of each unit being provided with actuating devices located so as to be accessible for immediate control from a single position of an operator, and the valves of all the filters being provided with actuating devices located at a central station.

3. A filter system provided with a system of gages so constructed as to indicate the positive and negative pressures in the inlet and outlet pipes of the filter severally at each individual unit and collectively at a central station.

4. A filter provided with a plurality of inspection-flasks connected with the inlet and outlet pipes thereof in such manner as to severally indicate the quality of the water in each operation of the filter.

5. A filter system embracing a plurality of units, each unit provided with a plurality of grouped inspection-flasks, tubes connecting the flasks with the several inlet and outlet pipes of the unit, a central station having a plurality of groups of inspection-flasks corresponding to the units, and tubes connecting the inlet and outlet pipes of each unit with the several flasks of the corresponding group at the central station.

6. A filter system provided with a plurality of controlling-valves which are connected with and actuated from a central station, and exhibition-flasks located at said central station and connected with the several filter units in such manner as to indicate the qualities of water in the various operations of the several filter units.

7. A filter system provided with a plurality of controlling-valves which are connected with and actuated from a central station, and a plurality of gages at said central station which are connected with the several filter units and indicate the positive and negative pressures in the various pipes connected with the several filter units.

8. A filter system provided with a plurality of controlling-valves which are actuated from a central station, a plurality of exhibition-flasks at said central station and connected with the inlet and outlet pipes of the several filter units, and a plurality of gages located also at the central station and connected with the several filter units in a manner to indicate positive and negative pressures in the various pipes connected with the filter units.

9. A filter system provided with a plurality of controlling-valves, and a central station provided with actuating devices for each of the several valves of the system and hydraulically connected therewith.

10. A filter system provided with a plurality of controlling-valves, a set of actuating devices for the valves of each unit located at the unit, and hydraulically connected with the valves thereof, a central station, and actuating devices for all of the valves of the several units at said central station which are severally hydraulically connected with the several valves of the system.

11. In a filter system comprising a plurality of filter units, the combination with inlet and outlet pipes therefor, and valves in said pipes, of means located at each unit for controlling the valves associated with each unit, and a central station, and actuating devices at the central station connected with said valves whereby the valves may be actuated and the operation of the several units controlled from said central station independently of the controlling devices located at each unit.

12. In a filter system comprising a plurality of filter units or tanks, the combination with inlet and outlet pipes, of a valve in each pipe, a plurality of sets of actuating-valves, one of said sets being located at said filter unit, the other of said sets being located at a central station, and connections between said actuating-valves and said hydraulic valves in said pipes.

13. In a filter system comprising a plurality of filter units or tanks, the combination with inlet and outlet pipes, a hydraulic valve in each pipe, and operating and gage boards at each of said units, and a central station, said operating and gage boards being provided with gages and actuating-valves, and said gages being connected with said pipes by means of tubes, and operative connections between said actuating-valves and said hydraulic valves in said pipes.

14. In a filter system comprising a plurality of filter units or tanks, the combination with inlet and outlet pipes, of a hydraulic valve in each pipe, an operating-board at each of said units, and at a central station, said operating-boards being provided with a plurality of gages, tubes connecting said gages with said pipes, a plurality of actuating-valves on each of said boards, hydraulic connections between said actuating-valves and said valves in said pipes, display vessels supported on said boards, and tubes leading downwardly from said tubes of said gages into said display vessels.

In testimony that I claim the foregoing as my invention I affix my signature, in presence of two witnesses, this 1st day of March, A. D. 1900.

IRA H. JEWELL.

Witnesses:
WILLIAM L. HALL,
GERTRUDE BRYCE.